(12) United States Patent
Kaplan et al.

(10) Patent No.: US 12,737,209 B2
(45) Date of Patent: Sep. 15, 2026

(54) INTERRUPT CONTROL USING A GUEST OWNED BACKING PAGE

(71) Applicants: ADVANCED MICRO DEVICES, INC., Santa Clara, CA (US); ATI TECHNOLOGIES ULC, Markham (CA)

(72) Inventors: David Kaplan, Austin, TX (US); Jelena Ilic, Austin, TX (US); Nippon Raval, Markham (CA); Philip Ng, Toronto (CA)

(73) Assignees: ADVANCED MICRO DEVICES, INC., Santa Clara, CA (US); ATI TECHNOLOGIES ULC, Markham (CA)

( * ) Notice: Subject to any disclaimer, the term of this patent is extended or adjusted under 35 U.S.C. 154(b) by 631 days.

(21) Appl. No.: 18/090,740

(22) Filed: Dec. 29, 2022

(65) Prior Publication Data

US 2024/0220297 A1 Jul. 4, 2024

(51) Int. Cl.
*G06F 9/455* (2018.01)

(52) U.S. Cl.
CPC ...... *G06F 9/45558* (2013.01); *G06F 9/45545* (2013.01); *G06F 2009/45579* (2013.01); *G06F 2009/45587* (2013.01)

(58) Field of Classification Search
CPC ............. G06F 9/45558; G06F 9/45545; G06F 2009/45579; G06F 2009/45587
See application file for complete search history.

(56) References Cited

U.S. PATENT DOCUMENTS

| | | | | |
|---|---|---|---|---|
| 2011/0197004 | A1* | 8/2011 | Serebrin | G06F 9/45558 710/267 |
| 2015/0127866 | A1 | 5/2015 | Zeng et al. | |
| 2016/0224362 | A1* | 8/2016 | Tsirkin | G06F 9/45558 |
| 2017/0206105 | A1 | 7/2017 | Alvarez et al. | |
| 2017/0220369 | A1* | 8/2017 | Kaplan | G06F 12/1045 |
| 2017/0242721 | A1 | 8/2017 | Tsirkin et al. | |
| 2020/0364158 | A1 | 11/2020 | Panginwar et al. | |
| 2020/0379927 | A1* | 12/2020 | Chan | G06F 12/0875 |
| 2020/0387326 | A1* | 12/2020 | Chan | G06F 3/061 |

(Continued)

OTHER PUBLICATIONS

International Search Report and Written Opinion issued in Application No. PCT/US2023/085134, mailed Apr. 24, 2024, 11 pages.

(Continued)

*Primary Examiner* — Dong U Kim

(57) ABSTRACT

Techniques for implementing programmable control by a guest virtual machine (VM) of interrupts at a processing system using a guest owned backing page are disclosed. The VM programs a guest owned backing page (e.g., a data structure in memory) that designates particular interrupts that are to be blocked. In response to detecting a designated interrupt, system hardware or software blocks the interrupt, rather than executing an interrupt handler to process the interrupt. The VM is thereby able to protect confidential information and program behavior with less risk of a malicious hypervisor failing to protect the VM from, e.g., unexpected or unwanted interrupts, thereby improving overall system security and predictability.

20 Claims, 7 Drawing Sheets

(56) References Cited

U.S. PATENT DOCUMENTS

2021/0089480 A1* 3/2021 Chan .................. G06F 9/45558
2023/0099517 A1* 3/2023 Neiger .................... G06F 9/542
712/244

OTHER PUBLICATIONS

International Preliminary Report on Patentability mailed Jul. 10, 2025 for International Application No. PCT/US2023/085134, 7 pages.

* cited by examiner

INTERRUPT CONTROL USING A GUEST OWNED BACKING PAGE

BACKGROUND

In a confidential computing environment, a processing system (e.g., a server) executes multiple software programs, such as virtual machines and a virtual machine manager (e.g., a hypervisor) to create a virtualized computing environment, wherein different software programs are owned by different entities. For example, in some confidential computing environments, different virtual machines executed by the environment are owned by different companies. A virtual machine manager (e.g., a hypervisor) controls the scheduling of the different virtual machines for execution and provides an interface between the virtual machines and the server hardware, so that each virtual machine (VM) is able to operate as if that VM were executing on its own dedicated hardware.

Because the different VMs are often owned by different entities, some confidential computing systems support security features that prevent one VM from accessing the data or other information associated with another VM. These security features are conventionally implemented by the virtual machine manager. However, this approach presents its own potential security issues, including allowing a malicious virtual machine manager or malicious VM to access confidential information of a given VM or identify patterns in encrypted data stored by a given VM.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
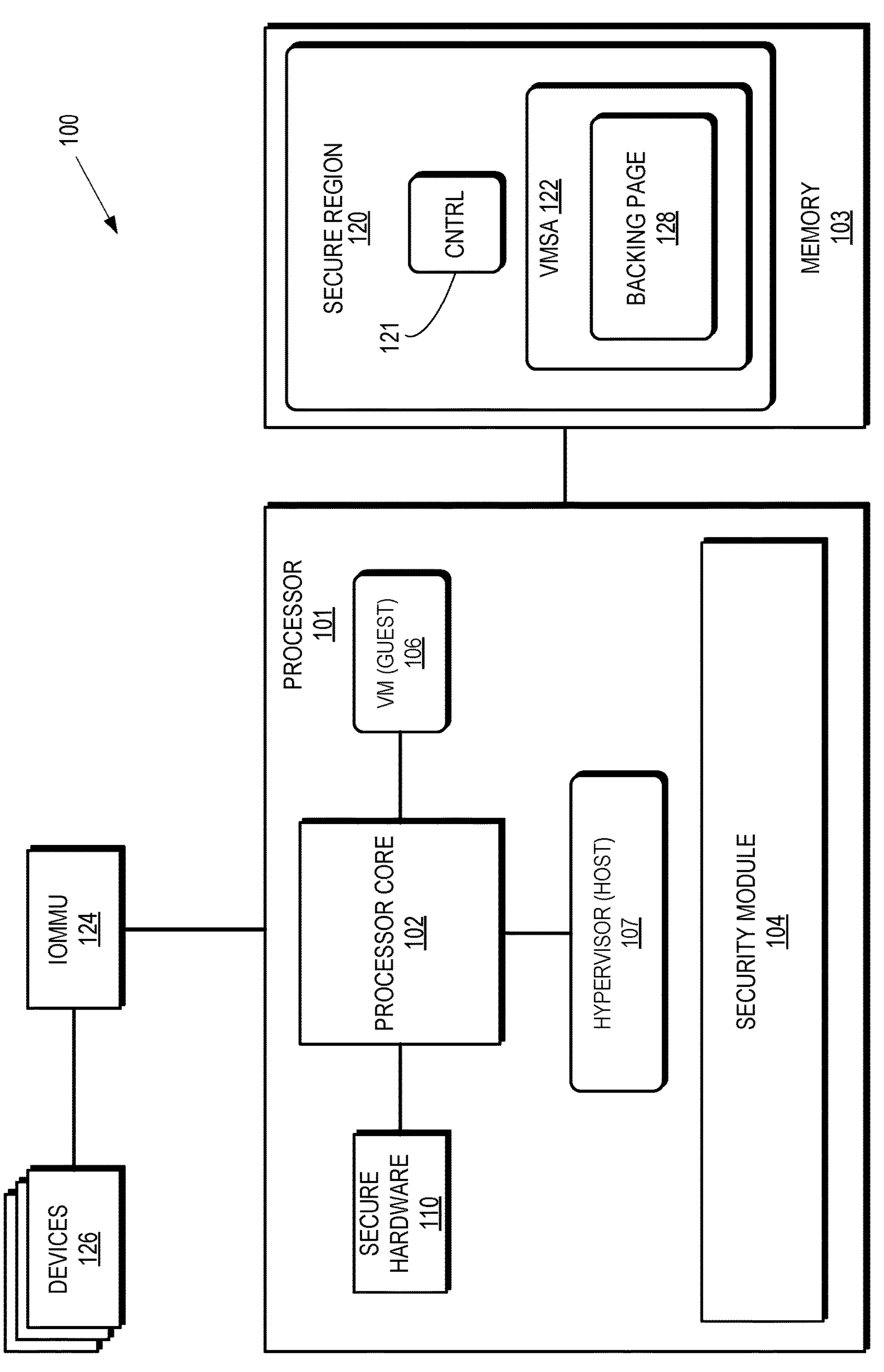
FIG. 1 is a block diagram of a processing system that supports control of interrupts based on a backing page owned by a guest virtual machine (VM) in accordance with some implementations.

FIGS. 1-7 illustrate techniques for implementing programmable control, by a guest virtual machine (VM), of interrupts at a processing system using a guest owned backing page. The VM programs a guest owned backing page (e.g., a data structure in memory) that designates particular interrupts that are to be blocked. In response to detecting a designated interrupt, system hardware or software blocks the interrupt, rather than executing an interrupt handler to process the interrupt. The VM is thereby able to protect confidential information and program behavior with less risk of a malicious hypervisor failing to protect the VM from, e.g., unexpected or unwanted interrupts, thereby improving overall system security and predictability.

To illustrate via an example, in some cases a particular type of interrupt may cause errors or otherwise manipulate a VM in order to render sensitive VM data vulnerable to unauthorized access, such as by allowing execution of a malicious interrupt handler. To prevent this vulnerability, system hardware and/or software is configured to block designated interrupts based on a guest owned backing page. Thus, in response to detecting an interrupt designated as blocked by the guest owned backing page, the system blocks the interrupt and prevents execution of any interrupt handlers, thereby preventing unauthorized access to the sensitive VM data. In some systems, interrupts are managed by a VM manager, such as a hypervisor. However, this approach is vulnerable to a malicious hypervisor. For example, a malicious hypervisor could inject unexpected interrupts into the VM that could in turn expose sensitive VM data to the hypervisor or one or more other VMs. Using the techniques herein, in some implementations, the guest owned backing page is owned and managed exclusively by a guest VM itself. Thus, the VM directly programs the guest owned backing page and thereby itself controls which interrupts are allowed or blocked by the system hardware and/or software.

To illustrate further, in some implementations a VM includes multiple layers, wherein each layer is assigned a different address space in a virtual address space associated with the VM. A security module (e.g., a security co-processor) of the processing system performs a specified security process to designate one of the multiple layers as a trusted layer of the VM. In some implementations, the trusted layer of the VM manages the security operations for the VM while other, less trusted layers, perform other operations, such as execution of an operating system or other software. To protect the guest owned backing page, the system hardware and/or software only executes instructions to program (e.g., modify) the guest owned backing page if those instructions are issued by the trusted layer of the VM—that is, if the instructions are issued from the address space corresponding to the trusted layer. This allows the trusted layer of the VM to control blocking of interrupts triggered by other layers of the VM, such as a particular interrupt triggered by an application associated with a less-trusted layer of the VM.

FIG. 1 illustrates a processing system 100 that supports control of interrupts by a VM using a guest owned backing page in accordance with some implementations. The processing system 100 is generally configured to execute sets of instructions (e.g., computer programs) to carry out tasks on behalf of an electronic device. Accordingly, in different implementations the processing system 100 is part of any of a variety of electronic devices. For purposes of description, it is assumed that the processing system 100 is part of an electronic device that implements a confidential computing environment, such as a server. However, in other implementations, the processing system 100 is part of a desktop computer, laptop computer, tablet, game console, and the like.

To implement the confidential computing environment, and to execute the sets of instructions, the processing system 100 includes a processor 101 and a memory 103. In some implementations, the processor 101 is a general-purpose processor, such as a central processing unit (CPU) including hardware structures configured to retrieve and execute the sets of instructions. The memory 103 includes one or more memory devices configured to store and retrieve data based on commands (e.g., store and load commands) received from the processor 101. Accordingly, in different implementations the memory 103 is random access memory (RAM), non-volatile memory (NVM), hard disk memory, and the like, or any combination thereof.

To execute the sets of instructions, the processor 101 includes a processor core 102, a security module 104, and secure hardware 110. It will be appreciated that in some implementations the processor 101 includes additional hardware to execute instructions, and to execute operations based on those instructions, such as additional processor cores, additional processing units (e.g., one or more graphics processing units), one or more controllers (e.g., memory controllers and input/output controllers), and the like.

The processor core 102 includes one or more instruction pipelines including a plurality of stages to execute instructions in a pipelined fashion. Thus, for example, in some implementations an instruction pipeline of the processor core 102 includes a fetch stage, a decode stage, a dispatch stage, one or more execution stages (with one or more corresponding execution units), a retire stage, and the like. The processor core 102 also includes, or has access to, memory structures and other hardware (not explicitly illustrated at FIG. 1) that support execution of instructions. For example, in some implementations the processor core 102 includes or has access to one or more cache structures to store data used for execution of the instructions.

In some implementations, the processor 101 is a simultaneous multithreading (SMT) processor. Accordingly, in some implementations the processor core 102, as well as other hardware of the processor 101, is configured to concurrently execute program threads (referred to herein simply as “threads”) by sharing hardware resources between the concurrently executing threads. For example, in at least some implementations, different threads concurrently execute at a given stage of an instruction pipeline of the processor core 102 by sharing the hardware resources of that pipeline stage. As another example, in some implementations different threads concurrently execute at the processor 101 by sharing portions of a cache of the processor core 102. For purposes of description, when two or more threads are concurrently executing at the processor 101, the processor 101 is referred to as being in an SMT mode.

The security module 104 is a set of hardware structures generally configured to create, monitor, and maintain a security environment for the processor 101. For example, in at least some implementations the security module 104 is configured to manage the boot process for the processor 101, initialize security related mechanisms for the processor 101, register different layers of a VM with different levels of trust, and monitor the processing system 100 for suspicious activity or interrupts and implement an appropriate response. In some implementations the security module 104 includes a microcontroller, a cryptographic coprocessor (CCP) to encrypt and decrypt data, local memory and local registers to store, for example, cryptographic keys, and includes interfaces to interact with the memory 103, the I/O controller of the processor 101, and configuration registers of the processor 101. In some implementations, the security module 104 includes Environment Management Control hardware capable of environmental and security checking to ensure that the processor 101 is operating according to specified security parameters.

The secure hardware 110 includes hardware, and associated microcode, of the processor 101 that supports the processor core 102 in executing instructions but is not accessible or modifiable by software executing at the processor core 102. For example, in some implementations the secure hardware 110 includes hardware that implements finite state machines, hardwired control unit operations, and other hardware that carries out at least some operations generated by the processor core 102, based on the executing instructions. However, as the operations of the secure hardware 110 are not accessible or modifiable by the executing software, the secure hardware 110 is able to provide security features in the course of executing operations as described further herein without those features being subject to unauthorized modification. For example, the secure hardware 110 is able to control the scheduling of software to be executed at the processor core 102.

As noted above, the processing system 100 is generally configured to implement a confidential computing environment, and in particular to execute a plurality of VMs (e.g., VM 106), also referred to as guests, and a hypervisor 107, also referred to as a host, to manage execution of the plurality of VMs. Because the different VMs, and at least in some cases the hypervisor 107, are often owned by different entities, the processing system 100 implements security features to protect the data of a given VM from access by other software, such as by another VM or by the hypervisor 107. For example, the processing system 100 implements data security for the VMs by implementing a secure region 120 of the memory 103 that stores encrypted data. In particular, the processor 101 is configured to encrypt specified data for each VM according to a corresponding private cryptographic key, and to store the encrypted data at the secure region 120. Because the data is encrypted, the data for one VM is protected from unauthorized access by other VMs and by the hypervisor 107. In at least some implementations, cryptographic keys for the VMs are managed by the security module 104, and data encryption and decryption for the VMs is executed by a dedicated hardware encryption/decryption module (not shown) at a memory controller (not shown) of the processor 101.

To further illustrate via an example, in the depicted implementation the secure region 120 stores two blocks of data for the VM 106: control information 121 and a VM storage area (VMSA) 122. The control information 121 stores control information for the VM 106, while the VMSA stores data for the software programs executed by the VM 106. In response to a request to store information by the VM 106 (e.g., in response to a VM exit), the processor 101 encrypts the information, using the cryptographic key associated with the VM 106, and stores the information at the corresponding block (either the control information 121 or the VMSA 122). Similarly, in response to a request to retrieve information from the secure region 120 by the VM 106, the processor 101 retrieves the requested information from the corresponding block, decrypts the information using the cryptographic key associated with the VM 106, and provides the decrypted information to the VM 106.

Figure 2:
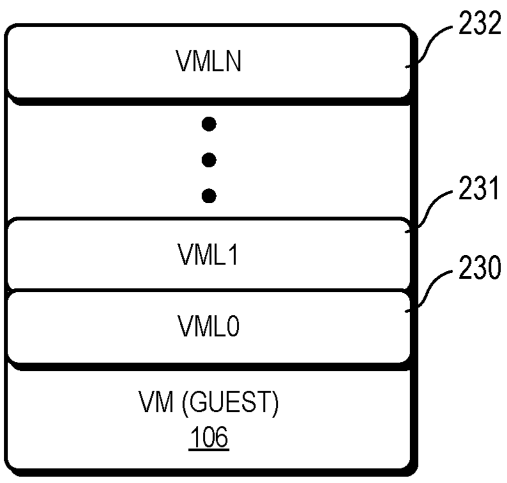
FIG. 2 is a block diagram illustrating an example of the VM of FIG. 1 having different layers, associated with different levels of trust, in accordance with some implementations.

To provide further security for VM data, in some implementations, the security module 104 is configured to associate different layers of the VM 106 with different levels of trust. FIG. 2 depicts an example of the VM 106 with different layers in accordance with some implementations.

In the depicted example, the VM 106 includes N layers (where N is an integer), including a layer 230, a layer 231, and additional layers through Nth layer 232. In some implementations, each of the layers 230-232 corresponds to a different address space. For example, in some implementations the VM 106 employs a virtual address space to designate the memory locations for each software instruction, and each data operand, for the different software programs and operations of the VM 106. Each of the layers 230-232 corresponds to a different portion of the virtual address space of the VM 106. Accordingly, the virtual address space for layer 231 corresponds to the virtual address space of the instructions and data operands for the programs and operations in layer 231. However, in some implementations, the VM 106 does not include different layers, such that all components of the VM 106 effectively operate at a high trust level.

Returning to FIG. 1, in at least some implementations the layers 230-232 are assigned different levels of trust by the security module 104. For example, in some implementations, before the VM 106 is permitted to be executed at the processing system 100, the VM 106 undergoes a provisioning process. During the provisioning process, the VM 106 provides authentication information, such as one or more security keys, to the security module 104 to register the layers 230-232 at different levels of trust. In response to verifying the authentication information, the security module 104 assigns each of the layers 230-232 the requested level of trust.

In at least some implementations, the level of trust for the layers 230-232 is enforced by the secure hardware 110. For example, in some cases, one or more specified operations, such as modification of page tables for the VM 106, are only permitted to be performed by the layers 230-232 having a threshold level of trust. In response to an instruction to perform the specified operation, the secure hardware 110 identifies, based on, e.g., the virtual address of the instruction, which of the layers 230-232 issued the instruction. If the identified layer has the requisite level of trust, the secure hardware executes the instructions. Otherwise, the secure hardware 110 does not execute the instruction. In this way, the secure hardware 110 ensures that instructions are executed only by those layers of the VM 106 that have a specified level of trust. For purposes of description, it is assumed that the layer 230 of the VM 106 has been registered by the security module 104 to have the highest level of trust, the layer 231 has been registered to have a lower level of trust, and so on, with the layer 232 having the lowest level of trust.

In some implementations, as shown in FIG. 1, the processing system 100 includes an input/output memory management unit (IOMMU) that manages input/output requests associated with one or more devices 126 as they interact with the processor 101 and/or memory 103. To further enhance security of the processing system 100, in some implementations, the secure hardware 110 and/or IOMMU 124 is configured to block designated interrupts based on a guest owned backing page 128 or a pointer to a guest owned backing page stored at VMSA 122. For example, in some implementations the guest owned backing page at the VMSA 122 designates a particular interrupt to be blocked, because it is expected that an interrupt handler associated with the interrupt could expose secure information at the processing system 100. The secure hardware 110 and/or IOMMU 124 is configured, in response to the interrupt, to identify whether the interrupt is to be blocked. If not, the secure hardware 110 proceeds to execute the interrupt handler and/or the IOMMU 124 notifies the VM 106 of the interrupt. If the guest owned backing page indicates that the interrupt is to be blocked, the secure hardware 110 does not execute the interrupt handler and/or the IOMMU 124 does not notify the VM 106 of the interrupt and, in some implementations, the IOMMU 124 notifies the security module 104 and/or the VM 106 that the interrupt has been blocked, e.g., by generating an exception. In response, in some implementations, the security module 104 takes remedial action, such as instructing the processor 101 to stop execution of software, sending an error message to the processor 101, the VM 106, or another processing system (not shown), and the like.

The guest owned backing page 128 is a programmable data structure. Accordingly, by storing particular values at the backing page 128 (also referred to as programming the backing page 128), the VM 106 is able to designate particular interrupts for blocking by the secure hardware 110 and/or the IOMMU 124. In some implementations, the backing page 128 is programmable only by the VM 106 or a trusted layer (e.g., layer 230) of the VM 106. In the depicted example of FIG. 1, the VM 106 programs the backing page 128 by storing control information at the backing page 128. Thus, in some implementations, the interrupts to be blocked are designated by the VM 106 or the trusted layer 230, via programming the backing page 128 with control information. This allows the creator of the VM 106 the flexibility to protect secure information from potential security breaches resulting from particular interrupts. In some implementations, the backing page 128 includes a general per-vector mask or control, which allows or blocks particular vectors, and a separate per-vector mask or control, which allows or prevents that vector being triggered by a hypervisor. Further, in some implementations, the VM 106 is able to program the backing page 128 directly and/or exclusively, rather than via a request to the hypervisor 107, thus further enhancing the security of the VM 106.

Figure 3:
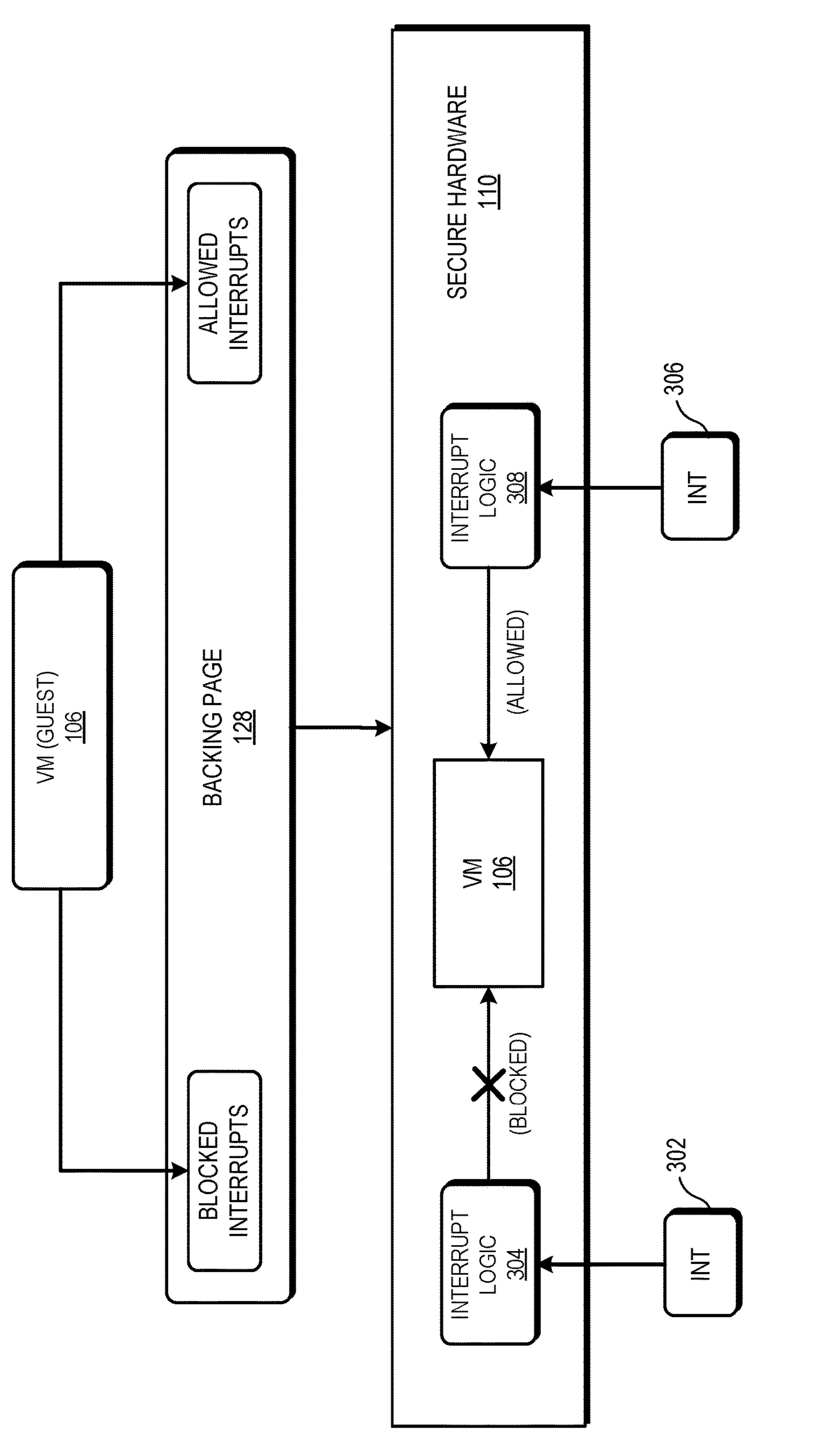
FIG. 3 is a block diagram illustrating an example of the processing system of FIG. 1 blocking and allowing interrupts based on a backing page owned by a guest VM in accordance with some implementations.

An example of the VM 106 programming the backing page 128 to block a designated interrupt at the processor 101 is illustrated at FIG. 3 in accordance with some implementations. In the depicted example, the VM 106 or a trusted layer 231 of the VM 106 programs the guest owned backing page 128 with control information. For the example of FIG. 3, control information in the backing page 128 designates that particular interrupts or types of interrupts are to be blocked and/or permitted. However, in other implementations, the control information designates, e.g., all interrupts, a particular interrupt, an interrupt of a particular type (such as maskable or non-maskable interrupts, exceptions, etc.), one or more interrupts of different corresponding types, interrupts associated with one or more particular devices, and/or interrupts associated with one or more particular types of devices, to be blocked.

After control information has been stored in the backing page 128, the hypervisor 107 or one of the devices 126 triggers an interrupt 302, which is processed by interrupt processing logic 304. Based on the control information at the backing page 128, the secure hardware 110 blocks the interrupt 302, and in particular prevents the interrupt from being injected into the VM 106. In addition, after the control information has been stored at the backing page 128, one or more of the devices 126 triggers a second interrupt 306, which is processed by interrupt processing logic 308. Based on the control information in the backing page 128, the secure hardware 110 does not block the interrupt 306 but instead stores an indication of the interrupt, e.g., in memory 103, and notifies the VM 106 of the interrupt. Thus, in the example of FIG. 3, the VM 106 is able to control which types of interrupts are blocked and/or permitted by the processor 101 and which devices or types of devices can provide interrupts to the VM 106. The VM 106 is therefore able to implement any of a variety of security protections on its own, particularly when a hypervisor may not be trusted, providing the VM 106 with the flexibility to adapt to changing security needs and environments.

Figure 4:
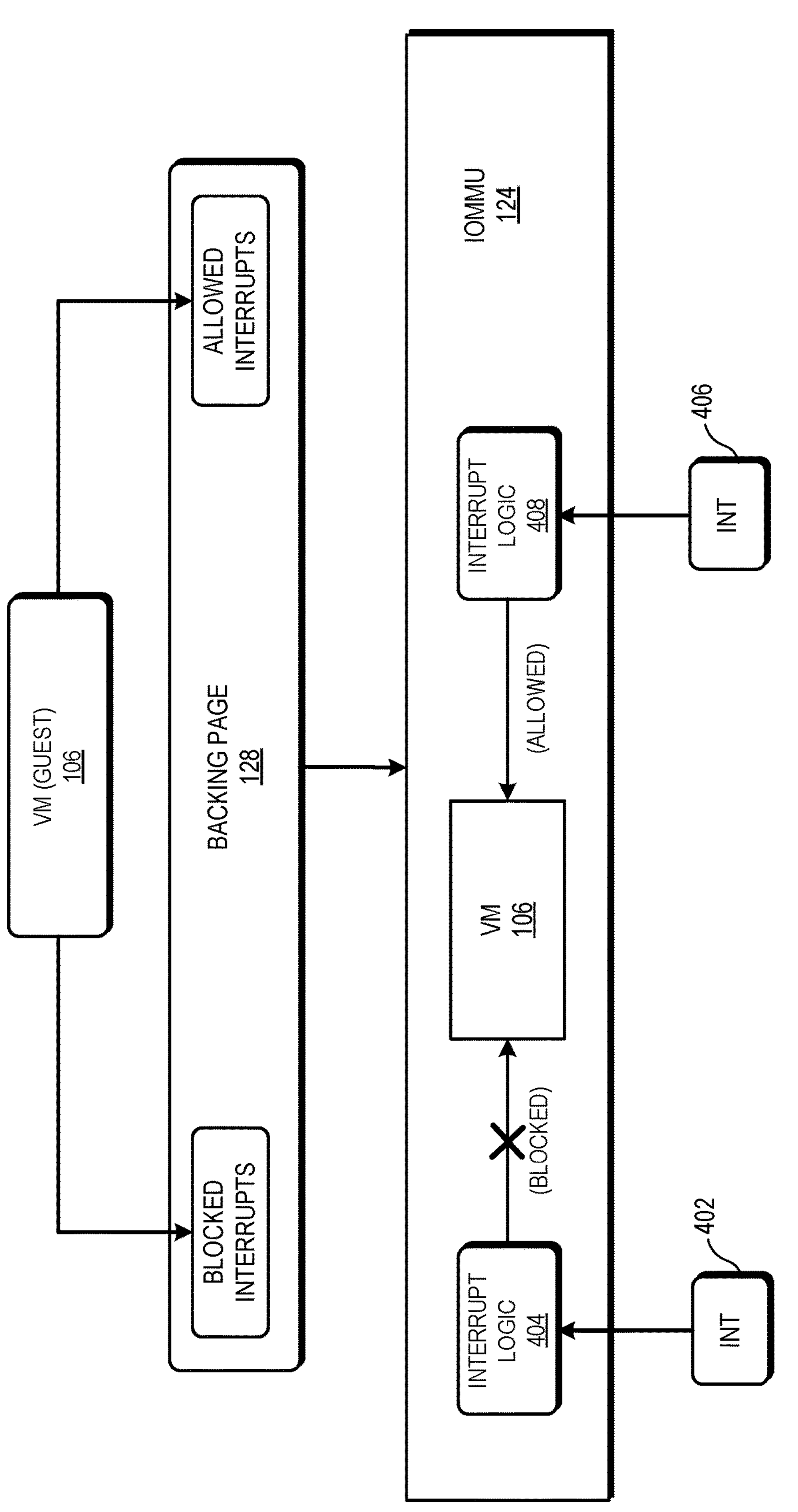
FIG. 4 is a block diagram illustrating an example of the processing system of FIG. 1 blocking and allowing interrupts based on a backing page owned by a guest VM in accordance with some implementations.

In some implementations, in addition to or rather than controlling interrupts using the secure hardware 110 of the processor 101, the IOMMU 124 is configured to control interrupts based on a guest owned backing page. An example is illustrated at FIG. 4 in accordance with some implementations. In the depicted example, the VM 106 programs the backing page 128 to store control information indicating that particular interrupts or types of interrupts are to be blocked and/or permitted. After control information has been stored in the backing page 128, one of the devices 126 triggers an interrupt 402, which is processed by interrupt processing logic 404. Based on the control information at the backing page 128, the IOMMU 124 blocks the interrupt 402, and in particular prevents the interrupt from being injected into the VM 106. In addition, after the control information has been stored at the backing page 128, one or more of the devices 126 triggers a second interrupt 406, which is processed by interrupt processing logic 408. Based on the control information in the backing page 128, the IOMMU 124 does not block the interrupt 406 but instead stores an indication of the interrupt, e.g., in memory 103, and notifies the VM 106 of the interrupt. Thus, in the example of FIG. 4, the VM 106 is able to control which types of interrupts are blocked and/or permitted and which devices or types of devices can provide interrupts to the VM 106. The VM 106 is therefore able to implement any of a variety of security protections on its own, particularly when a hypervisor may not be trusted, providing the VM 106 with the flexibility to adapt to changing security needs and environments.

It will be appreciated that the implementations of FIGS. 3 and 4 are examples only, and that in other implementations the VM 106 stores control information reflecting different combinations of interrupts, layers of the VM 106, devices 126, etc., in order to control which types of interrupts are blocked for the VM 106 or for each layer of the VM 106, which types of devices or which specific devices can generate interrupts for the VM 106, and so on. Thus, for example, in some implementations the VM 106 or trusted layer 231 sets control information in the backing page 128 so that one set of interrupts associated with a particular device are blocked by the secure hardware 110 and/or IOMMU 124.

Figure 5:
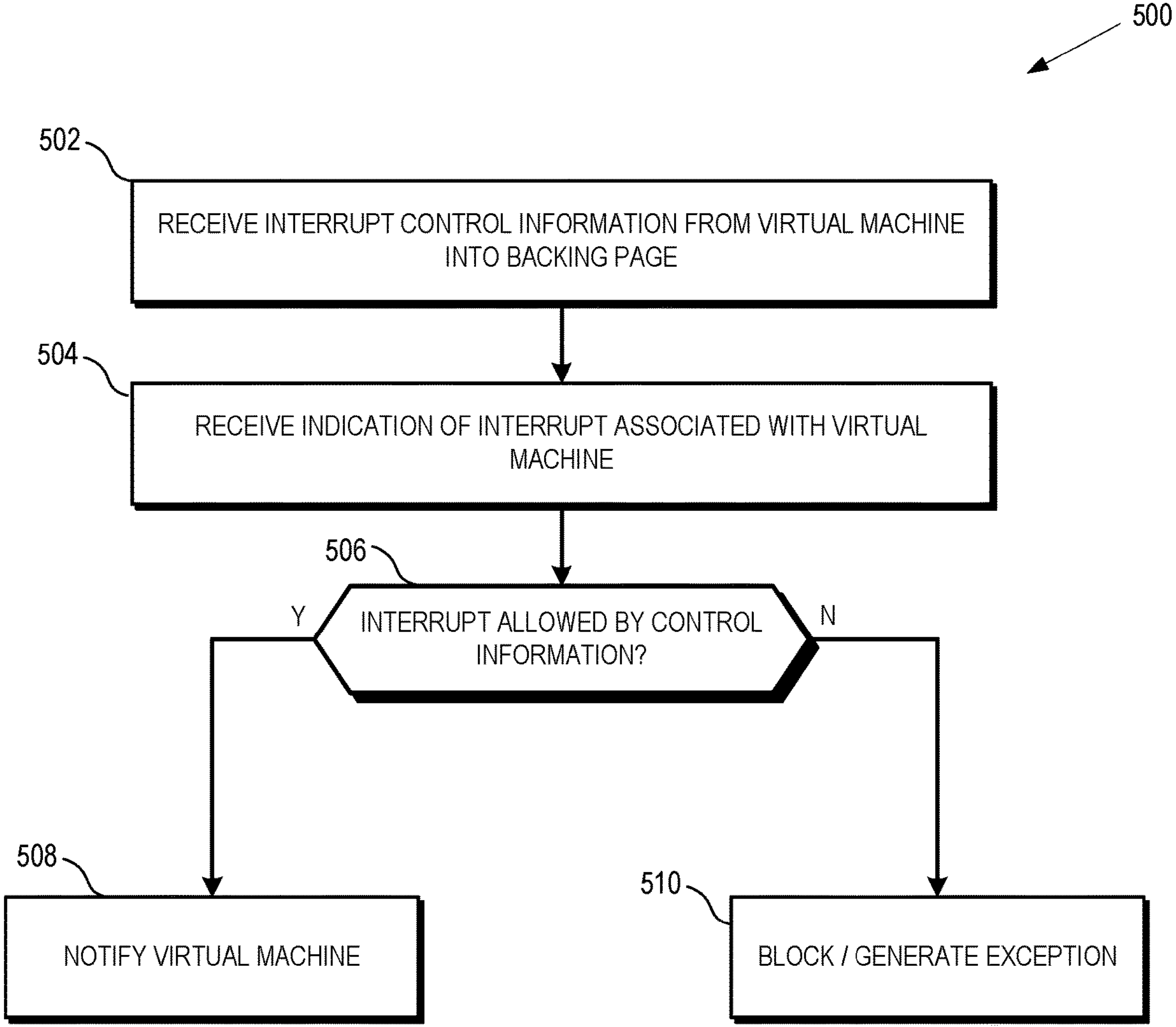
FIG. 5 is a flow diagram illustrating a method of controlling interrupts based on a backing page owned by a guest VM in accordance with some implementations.

FIG. 5 illustrates a flow diagram of a method 500 of controlling interrupts based on a backing page owned by a guest VM in accordance with some implementations. For purposes of description, the method 500 is described with respect to an example implementation at the processing system 100 of FIG. 1. However, it will be appreciated that in other implementations the method 500 is implemented in processing systems having different configurations than the processing system 100.

At block 502, the backing page 128 receives interrupt control information from the VM 106. At block 504, the secure hardware 110 or the IOMMU 124 receives an indication of an interrupt associated with the VM 106 from, e.g., the processor 101 or one of the devices 126, respectively. In response, at block 506, the secure hardware 110 or the IOMMU 124 checks the guest owned backing page 128, at the VMSA 122, to determine if the indicated interrupt is to be blocked. If not, the method flow moves to block 508 and the secure hardware 110 executes an interrupt handler corresponding to the indicated interrupt or the IOMMU 124 notifies the VM 106 of the interrupt. If, at block 506, the secure hardware 110 or IOMMU 124 determines that the interrupt is to be blocked, the method flow moves to block 510 and the secure hardware 110 or the IOMMU 124 blocks the interrupt. For example, the secure hardware 110 prevents execution of the interrupt handler, thereby protecting confidential information associated with the VM 106, or the IOMMU 124 prevents notification of the interrupt to the VM 106, and in some implementations generates an exception at the VM to indicate that an interrupt has been blocked.

Figure 6:
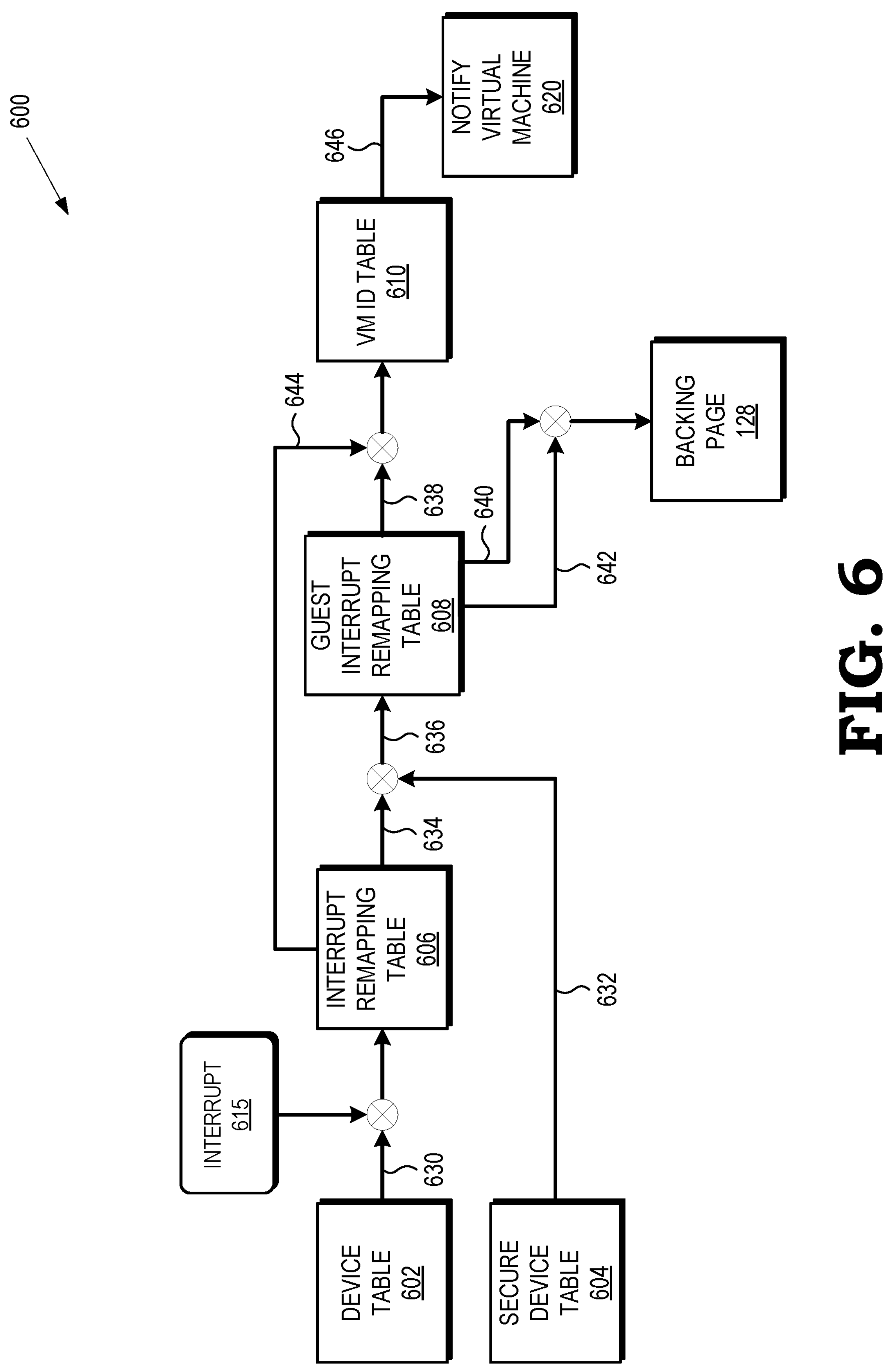
FIG. 6 is system diagram illustrating an example of data flow in a method of controlling device interrupts based on a backing page owned by a guest VM in accordance with some implementations.

FIG. 6 is a system diagram illustrating an example of data flow in a processing system 600 capable of controlling device interrupts based on a backing page owned by a guest VM in accordance with some implementations. In some implementations, the system 600 is a subset of processing system 100 of FIG. 1 and an IOMMU such as IOMMU 124 performs operations associated with the system 600. In some implementations, the system 600 includes a device table 602 managed by a hypervisor such as hypervisor 107 and a secure device table 604 managed by a secure processor such as security module 104 and modifiable by a guest VM such as VM 106. In some implementations, the system 600 further includes an interrupt remapping table 606 managed by the hypervisor 107 and a guest owned interrupt remapping table 608 managed by the guest VM 106. In some implementations, the system further includes a VM identification table 610 controlled by the hypervisor 107 and a backing page, such as backing page 128, controlled by the guest VM 106. In some implementations, in order to reduce reliance on the hypervisor 107 and increase security, the guest interrupt remapping table 608 and backing page 128 are only modifiable by the VM 106. In some implementations, the guest interrupt remapping table 608 includes controls that effectively allow or prevent an interrupt vector being triggered by an I/O device assigned to the VM 106. As shown in FIG. 6, at a high level, the system 600 detects an interrupt 615 and performs operations to securely process the interrupt 615 such that, e.g., only interrupts specified as allowed by a VM in backing page 128 are allowed to be passed to the VM, interrupts specified as blocked are blocked for the VM, and/or which particular devices or types of devices can or cannot generate interrupts for the VM, and so on. However, the system 600 of FIG. 6 is better understood in combination with FIG. 7, and so the method of FIG. 7 is discussed hereinbelow along with further details of example system 600.

Figure 7:
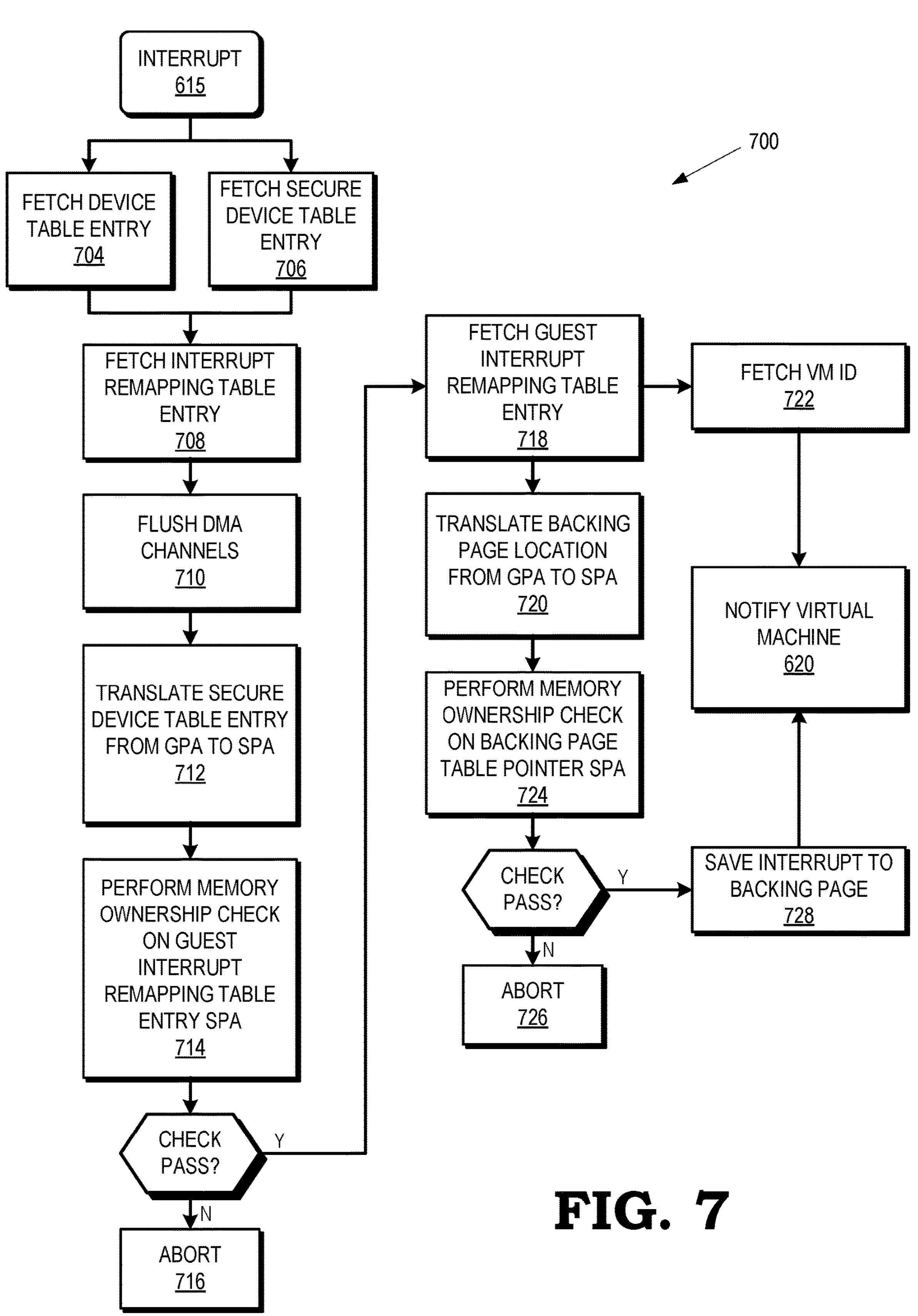
FIG. 7 is a flow diagram illustrating a method of controlling device interrupts based on a backing page owned by a guest VM using the system of FIG. 6 in accordance with some implementations.

FIG. 7 is a flow diagram illustrating a method 700 of controlling device interrupts based on a backing page owned by a guest VM using the system of FIG. 6 in accordance with some implementations. As shown in FIG. 7, in some implementations, the method 700 begins with an IOMMU such as IOMMU 124 of FIG. 1 detecting an interrupt, such as interrupt 615 of FIG. 6. After detecting the interrupt 615, at block 704, the IOMMU 124 fetches a device table entry 630 from device table 602 and, at block 706, fetches a secure device table entry 632, i.e., an address indicating the location of the guest owned interrupt remapping table 608, from secure device table 604. At block 710, in some implementations, the IOMMU 124 flushes direct memory access (DMA) channels, and, at block 712, in some implementations, translates the secure device table entry 632 from a guest physical address to a system physical address. In some implementations, in order to translate the secure device table entry 632 from a guest physical address to a system physical address, the IOMMU 124 retrieves a guest virtual vector 634 for the interrupt 615 by indexing the interrupt remapping table 606 based on the device table entry 630 and the interrupt 615. After retrieving the guest virtual vector 634 for the interrupt 615, the IOMMU 124 translates the secure device table entry 632 from a guest physical address to a guest interrupt remapping table system physical address 636 for the guest owned interrupt remapping table 608 based on the guest virtual vector 634.

At block 714, the IOMMU 124 performs a memory ownership check on the translated guest interrupt remapping table system physical address 636 for the guest owned interrupt remapping table 608 to ensure the target VM owns that portion of memory. If the target VM does not own that portion of memory and/or if the device triggering the interrupt 615 is not assigned to the target VM, in some implementations, the IOMMU 124 aborts the method at block 716 and, in some implementations, generates an exception to notify the target VM that an interrupt was blocked. However, if the target VM does own that portion of memory, the method 700 proceeds to block 718, where the IOMMU 124 fetches a guest interrupt remapping table entry from the guest owned interrupt remapping table 608. Based on the guest interrupt remapping table entry in the guest owned interrupt remapping table 608, which in some implementations maps host-translated interrupts to guest vectors or blocks interrupts if no mapping is configured, the IOMMU 124 identifies a guest physical destination 638 and a backing page location 640 and produces a guest physical vector 642 based on the interrupt 615.

At block 720, the IOMMU 124 translates the backing page location 640 from a guest physical address to a system physical address. At block 724, the IOMMU 124 performs a memory ownership check on the translated backing page location for the backing page 128 to ensure the target VM owns that portion of memory. If the target VM does not own that portion of memory, in some implementations, the IOMMU 124 aborts the method at block 726 and, in some implementations, generates an exception to notify the target VM that an interrupt was blocked. However, if the target VM does own that portion of memory, the method 700 proceeds to block 728, where the IOMMU 124 stores an indication of the interrupt 615 in the backing page 128.

Substantially simultaneously with the operation of block 720, at block 722, the IOMMU 124 fetches VM identification information from the VM identification table 610 based on the guest physical destination 638 and a VM identification table location 644 drawn from the interrupt remapping table 606. In some implementations, the IOMMU 124 retrieves the VM identification table location 644 by indexing the interrupt remapping table 606 based on the device table entry 630 and the interrupt 615. After the IOMMU 124 both fetches the VM identification information at block 722 and stores an indication of the interrupt 615 in the backing page 128 at block 728, at block 620, the IOMMU 124 notifies the target VM of the interrupt 615, e.g., by sending a doorbell notification 646 to the target VM. If the target VM is not currently running, in some implementations, the IOMMU 124 requests the hypervisor 107 to schedule a notification for the VM such that the hypervisor 107 will notify the target VM of the interrupt the next time the target VM runs. Although not shown in FIG. 7 for clarity, in some implementations, one or more of the "fetch" blocks (e.g., blocks 704, 706, 708, 718) include caching routines that enable the IOMMU 124 to cache the fetched information for later use in order to accelerate processing.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disk, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some implementations, certain aspects of the techniques described above are implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific implementations. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific implementations. However, the benefits, advantages, solutions to problems, and any feature(s) that may cause any benefit, advantage, or solution to occur or become more pronounced are not to be construed as a critical, required, or essential feature of any or all the claims. Moreover, the particular implementations disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular implementations disclosed above may be altered or modified and all such variations are considered within the scope of the disclosed subject matter. Accordingly, the protection sought herein is as set forth in the claims below.

What is claimed is:

1. A method, comprising:

receiving, at a processor operatively coupled to a memory, a request from a trusted layer of a virtual machine to store control information in a guest owned backing page in the memory to allow or block an interrupt, wherein the virtual machine comprises a plurality of layers and the trusted layer is designated by a security co-processor performing a security process; and in response to the request and in response to detecting the interrupt, allowing or blocking the interrupt based on the control information.

2. The method of claim 1, wherein the control information designates a particular type of interrupt.

3. The method of claim 1, wherein the control information designates interrupts associated with a particular device.

4. The method of claim 1, wherein the control information designates interrupts associated with a particular type of device.

5. The method of claim 1, wherein blocking the interrupt comprises generating an exception.

6. The method of claim 1, wherein blocking the interrupt comprises blocking the interrupt at the processor.

7. The method of claim 1, wherein blocking the interrupt comprises blocking the interrupt at a memory management unit.

8. The method of claim 1, further comprising encrypting the guest owned backing page.

9. The method of claim 1, further comprising:

translating a location of a guest owned interrupt remapping table from a guest physical address to a system physical address based on a guest virtual vector, wherein:

the guest virtual vector is identified based on a device table entry and the interrupt, and the guest owned interrupt remapping table maps interrupts to guest physical vectors; and blocking the interrupt if the memory at the translated system physical address is not guest owned.

10. The method of claim 9, further comprising blocking the interrupt if the guest owned interrupt remapping table does not specify a mapping for the interrupt.

11. The method of claim 9, further comprising storing an indication of the interrupt in the guest owned backing page when the memory at the translated system physical address is guest owned.

12. A system, comprising:

a memory configured to store a guest owned backing page; and a processor operatively coupled to the memory, wherein the processor is configured to:

receive a request from a trusted layer of a virtual machine to store control information in the guest owned backing page to allow or block an interrupt, wherein the virtual machine comprises a plurality of layers and the trusted layer is designated by a security co-processor performing a security process; and in response to the request and in response to detecting the interrupt, allow or block the interrupt based on the control information.

13. The system of claim 12, wherein the control information designates a particular type of interrupt.

14. The system of claim 12, wherein the control information designates interrupts associated with a particular device.

15. The system of claim 12, wherein the control information designates interrupts associated with a particular type of device.

16. The system of claim 12, wherein blocking the interrupt comprises generating an exception.

17. The system of claim 12, wherein blocking the interrupt comprises blocking the interrupt at a memory management unit.

18. The system of claim 12, wherein the guest owned backing page is encrypted.

19. A system, comprising:

a memory configured to store a guest owned paging page;

a processor operatively coupled to the memory, wherein the processor is configured to receive a request from a trusted layer of a virtual machine to store control information in the guest owned backing page to allow or block an interrupt, wherein the virtual machine comprises a plurality of layers and the trusted layer is designated by a security co-processor performing a security process; and input/output memory management unit (IOMMU) hardware configured to, in response to detecting the interrupt, allow or block the interrupt based on the control information.

20. The system of claim 19, wherein the IOMMU hardware is further configured to use a guest owned interrupt remapping table to control interrupts in the virtual machine.

* * * * *